(12) United States Patent
Owechko et al.

(10) Patent No.: US 8,818,036 B1
(45) Date of Patent: Aug. 26, 2014

(54) CONTEXTUAL BEHAVIOR STATE FILTER FOR SENSOR REGISTRATION

(75) Inventors: Yuri Owechko, Newbury Park, CA (US); Shinko Y. Cheng, Campbell, CA (US); Swarup Medasani, Thousand Oaks, CA (US); Kyungnam Kim, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 203 days.

(21) Appl. No.: 13/558,257

(22) Filed: Jul. 25, 2012

(51) Int. Cl.
*G06K 9/00* (2006.01)
(52) U.S. Cl.
USPC .......................................................... 382/103
(58) Field of Classification Search
CPC ..... G06T 7/0014; G06T 7/0087; G01S 17/89; A61B 2019/5265; A61B 2019/5295
USPC .......................................................... 382/103
See application file for complete search history.

(56) References Cited

U.S. PATENT DOCUMENTS

2010/0253597 A1* 10/2010 Seder et al. ...................... 345/7

OTHER PUBLICATIONS

M. Isard, A. Blake, Condensation—Conditional Density Propagation for Visual Tracking. Int'l Journal of Computer vision 29(1):5-26, 1998.
Hieu T. Nguyen, Qiang Ji, Arnold W.M. Smeulders, Spatio-Temporal Context for Robust Multitarget Tracking, IEEE Trans. on Pattern Analysis and Machine Intelligence, 29(1):52-64, Jan. 2007.
Brian O'Hern, Mark Kozak, Baseline Tracker (BRAT), The Air Force Research Laboratory (AFRL), Distribution Statement A, DARPA-SN-10-05_AFRL, Nov. 2009.

* cited by examiner

*Primary Examiner* — Amir Alavi
*Assistant Examiner* — Kenny Cese
(74) *Attorney, Agent, or Firm* — Tope-McKay & Associates (57) ABSTRACT

Described is a system for registering a viewpoint of an imaging sensor with respect to a geospatial model or map. An image of a scene of a geospatial region comprising an object is received as input. The image of the scene is captured by a sensor having a current sensor state. Observation data related to the object's state is received, wherein the observation data comprises an object behavior of the object given the geospatial region. An estimate of the current sensor state is generated using a probability of an observation from the observation data given the current sensor state x. Finally, the image of the scene is registered with a geospatial model or map based on the estimate of the current sensor state.

15 Claims, 7 Drawing Sheets

CONTEXTUAL BEHAVIOR STATE FILTER FOR SENSOR REGISTRATION

BACKGROUND OF THE INVENTION (1) Field of Invention

The present invention relates to a system for registering a viewpoint of an imaging sensor with respect to a geospatial model or map using contextual information.

(2) Description of Related Art

Image registration is the process of transforming different sets of data into one coordinate system. Previous methods for image or sensor viewpoint registration rely on matching features between the sensor-generated image and the larger image or model of the scene. These features are based on processed pixel values that encode some measure of local similarity in color, brightness, shape, texture, or spatial correlations in variations of these properties. This dependence on pixel values makes registration sensitive to variations in Sensor response, lighting, viewpoint, and modality.

Previous approaches, such as described by Nguyen et al. in "Spatio-Temporal Context for Robust Multitarget Tracking" in Institute of Electrical and Electronic Engineers (IEEE) Transactions on Pattern Analysis and Machine Intelligence, 29(1):52-64, have incorporated contextual information in the form of relative spatial positioning of the target among other targets in a neighborhood. However, the relationship between the behaviors of moving targets and the geospatial context was not utilized. The Baseline Tracker (BRAT), a multi-target tracking algorithm developed by the Air Force Research Laboratory, utilizes road map information to introduce pseudo-measurements for input to the Kalman tracker when the actual measurement is close to exactly one road. The purpose of the Kalman tracker is to use measurements observed over time, containing noise (i.e., random variations) and other inaccuracies, and produce values that tend to be closer to the true values of the measurements and their associated calculated values. The pairing is made by extending the principal component vector of the measurement error covariance an amount 3.5 times the principal component magnitude until it intersects the road. The BRAT method uses the road map in another way by setting the heading of the target along the long axis of the road. Further, the BRAT method is deterministic and not probabilistic and is, therefore, limited in its robustness to noise and suboptimal in the ad hoc manner of incorporating additional contextual information. The BRAT method also does not utilize the concept of using the linkage between target behavior and map data for sensor registration.

Thus, a continuing need exists for a system and method of sensor viewpoint registration which utilizes the relationship between expected object behaviors and geospatial context.

SUMMARY OF THE INVENTION

The present invention relates to a system for sensor viewpoint registration. The system comprises one or more processors and a memory having instructions such that when the instructions are executed, the one or more processors perform operations of receiving an image of a scene of a geospatial region comprising at least one object, wherein the image of the scene is captured by a sensor having a current sensor state x and a previous sensor state. Observation data z related to the at least one object's state is received, wherein the observation data z comprises at least one object behavior of the at least one object given the geospatial region. An estimate of the current sensor state x is generated using a probability of an observation from the observation data z given the current sensor state x. The image of the scene with a geospatial model or map is registered based on the estimate of the current sensor state x.

In another aspect, the system further performs an operation of converging a set of particles on the estimate of the current sensor state x using the observation data z and the previous sensor state, wherein the set of particles represent a set of candidate registration solutions.

In another aspect, the system further performs an operation of updating the set of particles $$\{s_t^{(n)}, n = 1 \ldots N\}$$

and their weights $$\{\pi_t^{(n)}, n = 1 \ldots N\}$$

from which the estimate of the current sensor state x given the observation data z is determined as follows:

$$\hat{x}_t = E[x \mid z] = \sum_{n=1}^{N} \pi_t^{(n)} s_t^{(n)},$$

where $\hat{x}_t$ denotes a state of the sensor at time t, E denotes an expectation operator, and $\Sigma$ represents a summation.

In another aspect, the system further performs an operation of determining the weights of each particle in the set of particles using a data likelihood function P(z|x), wherein the data likelihood function P(z|x) describes the probability of an observation being made at z given the current sensor state x.

In another aspect, the system further performs an operation of factorizing the data likelihood function P(z|x) into two densities: a function of a distance from the current sensor state x which captures noise of the sensor, and a function that determines whether the observation data z is located in a high likelihood geospatial region, according to the following:

$$P(z|x) = P_a(z|x) P_b(z|x), \text{ where}$$

$$P_a(z|x) = A \exp(-\|z - x\|_\Sigma^2)$$

$$P_b(z \mid x) = \begin{cases} \alpha & \text{if } x \in O \\ 1 - \alpha & \text{if } x \notin O \end{cases}.$$

where $P_a$(z|x) denotes a probability density of the noise of the sensor parameterized by a multi-dimensional covariance matrix $\Sigma$, A is chosen to normalize $P_a$(z|x), $P_b$(z|x) denotes a likelihood of measuring observation data z, which depends on whether the current sensor state x is in a high likelihood geospatial region O, $\alpha$ denotes a constant set to a value between 0.5 and 1 which determines a relative weighting given to geospatial information related to the geospatial region, exp( ) denotes the exponential function $e^{(\cdot)}$, $\| \ldots \|_\Sigma$ denotes the Euclidean norm normalized by the covariance matrix $\Sigma$, $\in$ means an element of $\notin$ means is not an element of, and O is a set of sensor states that correspond to points in the geospatial region that have high likelihoods for generating observation data z.

In another aspect, the system further performs an operation of using the estimate of the current sensor state x to improve sensor measurements of the observation data z.

As can be appreciated by one in the art, the present invention also comprises a method for causing a processor to perform the operations described herein.

As can be appreciated by one in the art, the present invention also comprises a computer program product comprising computer-readable instruction means stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for registering a viewpoint of an imaging sensor with respect to a geospatial model or map using contextual information. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the an that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Principal Aspects

The present invention has three "principal" aspects. The first is a system for image registration with respect to a geospatial model or map using contextual information. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the an, this system may be incorporated into a wide variety of devices that provide different functionalities. The second principal aspect is a method for image registration with respect to a geospatial model or map using contextual information. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a non-transitory computer-readable medium such as a floppy disk, a CD-ROM, and a flash drive.

(2) Specific Details

The present invention is system, method, and computer program product for registering a viewpoint of an imaging sensor (e.g., camera) with respect to a geospatial model or map using contextual information from objects within the viewpoint. The invention described herein utilizes contextual information to associate distributions of object detections with the most probable of candidate viewpoints of sensors.

Specifically, the present invention uses correlations of specific object behaviors with geospatial regions to perform sensor registration.

The mechanism is based on an augmented version of the CONDENSATION (conditional density propagation) particle filter for state estimation, as described by Isard and Blake in "Condensation—Conditional Density Propagation for Visual Tracking" in the International Journal of Computer Vision 29(1): 5-28, 1998, which is hereby incorporated by reference as though fully set forth herein. The original CONDENSATION filter propagates a particle density function in all directions uniformly and has no notion of a feasible space. The present invention augments a data likelihood function such that the particles (i.e., candidate registration solutions) are given a higher weight if they represent registration solutions that are more consistent with the expected geospatial behaviors of objects, non-limiting examples of which include humans and vehicles.

In the particle filter paradigm for state estimation of the present invention, the state space of sensor (e.g., camera) registration $x_t$ at a moment in time t is defined, for example, as position and orientation $x_t=(x,y,z,\alpha,\beta,\gamma)$, wherein (x,y,z, $\alpha,\beta,\gamma$) represent six degrees of freedom. $\alpha,\beta,\gamma$ represent the camera pitch, yaw, and roll angles. Through this state space, the task of sensor registration is to estimate the camera's state. Observations z of each object's state are made, but they are typically noisy. There is an assumed functional relationship between the observation z and state x, the simplest may be $z_t=f(x_t)=x_t+n_t$, where $n_t$ is noise.

One of the functions of the registration algorithm of the present invention is to estimate the true state of the camera given these noisy observations. These estimates are made via the theory of Sequential Bayesian Estimation, of which the CONDENSATION filter (CEF) is one such estimator implementation. This type of estimator does not make Gaussian or unimodal assumptions regarding the observation noise distribution, making this estimator very powerful. The principal application of the CONDENSATION algorithm is to detect and track the contour of objects moving in a cluttered environment. The CONDENSATION algorithm consists of iterating over four steps to update each of a set of N particles to converge to an estimate of the state using the current observations and previous state as follows: 1) select, 2) predict, 3) measure, and 4) estimate. In step 1, the algorithm randomly selects a particle from the set $\{s_t^{(n)}, n=1 \ldots N\}$. In step 2, the new particle position is predicted. In step 3, the weight $\{\pi_t^{(n)}, n=1 \ldots N\}$ for the particle is measured from the measured data z. In step 4, the posterior mean (i.e., the estimate of the state x given the observations z) is estimated as follows: 1-25,E $$\hat{x}_t = E[x \mid z] = \sum_{n=1}^{N} \pi_t^{(n)} s_t^{(n)}.$$

where $\hat{x}_t$ denotes a state of the sensor at time t, E denotes an expectation operator, x denotes the sensor's state, z denotes observation data of each object's state, and $\Sigma$ represents a summation.

Figure 1:
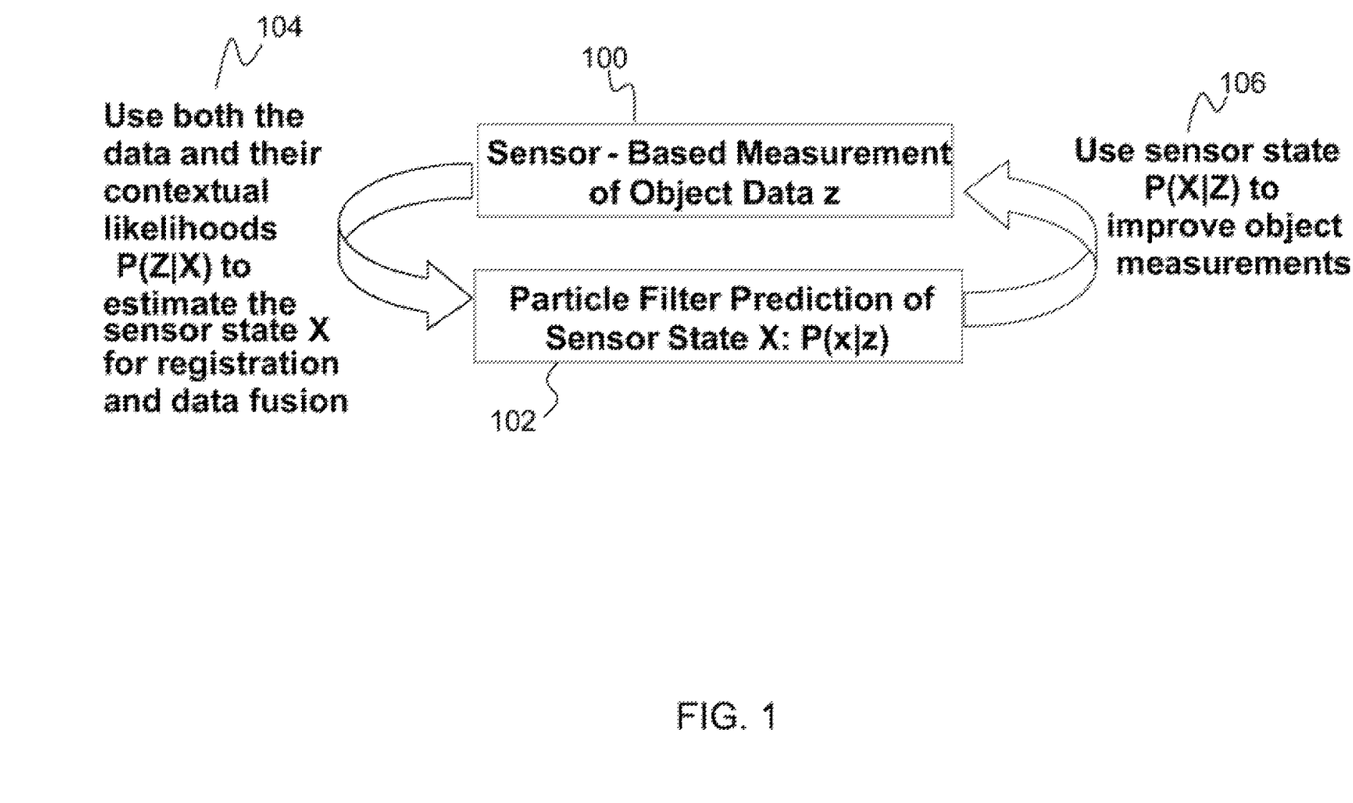
FIG. 1 is an illustration of the contextual estimation filter (CEF) according to the present invention.

As illustrated in FIG. 1, the CEF of the present invention is based on a particle filter in which information about the dependence of object behaviors on geospatial context is incorporated in the data likelihood function. Sensor-based measurements of an object's state (i.e., position and orientation) x are made 100. In the CEF of the present invention, context is incorporated into the algorithm by modifying the data likelihood density used to compute step 3 above: measure. This step computes the weights of each particle (i.e., candidate registration solution) using the defined data likelihood function P(z|x), which describes the probability of an observation being made at z given the current state x. The distribution of the particles is controlled by an external algorithm so as to approximate a probability density function. The data likelihood function P(z|x) is factorized into two densities: 1) a function of the distance from the current state which captures the noise of the sensor, and 2) a function that determines whether the observation is located in a high likelihood geospatial region which captures the context according to the following:

$$P(z|x)=P_a(z|x)P_b(z|x), \text{ where}$$

$$P_a(z \mid x) = A\exp(-\|z - x\|_\Sigma^2)$$

$$P_b(z \mid x) = \begin{cases} \alpha & \text{if } x \in O \\ 1-\alpha & \text{if } x \notin O \end{cases}.$$

where $P_a$(z|x) denotes a probability density of the noise of the sensor parameterized by a multi-dimensional covariance matrix $\Sigma$, and A is chosen to normalize $P_a$(z|x). $P_b$(z|x) denotes a likelihood of measuring observation data z, which depends on whether the current sensor state x is in a high likelihood geospatial region O, $\alpha$ denotes a constant set to a value between 0.5 and 1 which determines a relative weighting given to geospatial information related to the geospatial region, exp( ) denotes the exponential function $e^{(\,)}$, $\|\ldots\|_\Sigma$ denotes the Euclidean norm normalized by the covariance matrix $\Sigma$, $\in$ means an element of, $\notin$ means is not an element of, and O is a set of sensor states that correspond to points in the geospatial region that have high likelihoods for generating observation data z. Hence, the system represents P(z|x) as the product of two densities, $P_a$ and $P_b$. $P_a$ and $P_b$ are first computed and then multiplied to form P(z|x).

The system then uses both the data and their contextual likelihoods P(z|x) to predict the sensor state x 102: P(x|z) for registration and data fusion 104. The sensor state x 102 is then used to improve object measurements 106. The goal is to reduce false alarms and improve localization accuracy. With this augmentation to the CONDENSATION model, estimates of the camera viewpoint effectively avoid areas of the scene in which the objects or their behaviors are unlikely to appear. The CEF uses contextual relationships between object behaviors and their environment to predict the sensor state. For example, it is known that regions where cars are making both left and right turns are strongly associated with intersections. If several intersections are present in a scene, detections of vehicle behaviors can be used to register the sensor viewpoint to a map using the CEF. Thus, the CEF uses contextual relationships between dynamic objects and their environment to predict the sensor state x 104.

Figure 2:
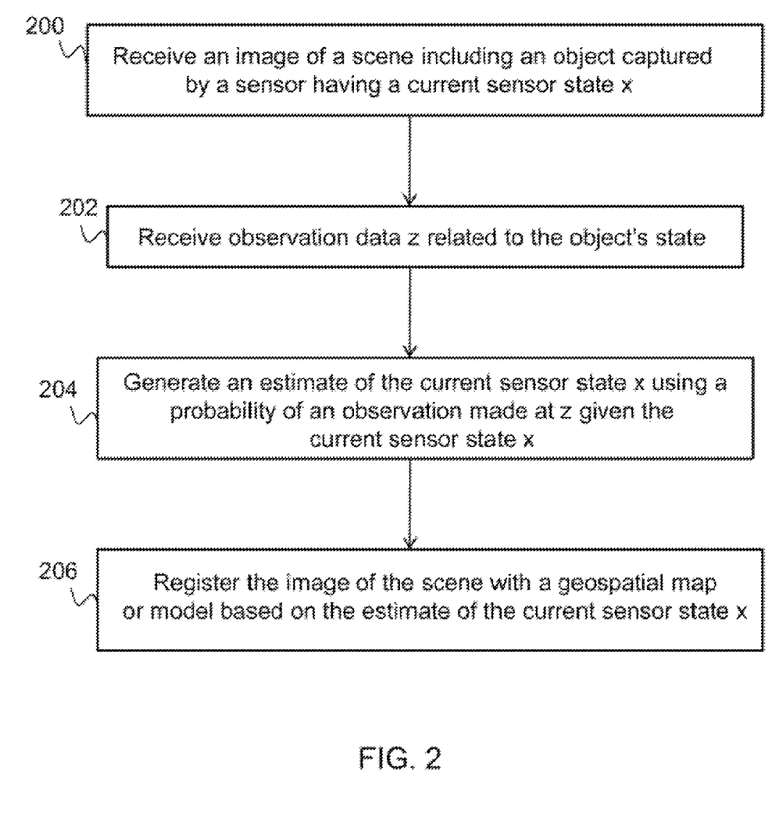
FIG. 2 is a flow diagram depicting a method of sensor viewpoint registration according to the present invention.

FIG. 2 is a flow diagram summarizing the major steps of sensor viewpoint registration according to the present invention. In a first step 200, an image of a scene of a geospatial region including at least one object is captured by a visual sensor (e.g., camera) having a current sensor state x is received. In a subsequent step 202, observation data z related to the object's state is received. In a following step 204, an estimate of the current sensor state x is generated using a probability of an observation made at z given the current sensor state x. In a final step 206, the image of the scene is registered with a geospatial map or model based on the estimate of the current sensor state x.

Figure 3A:
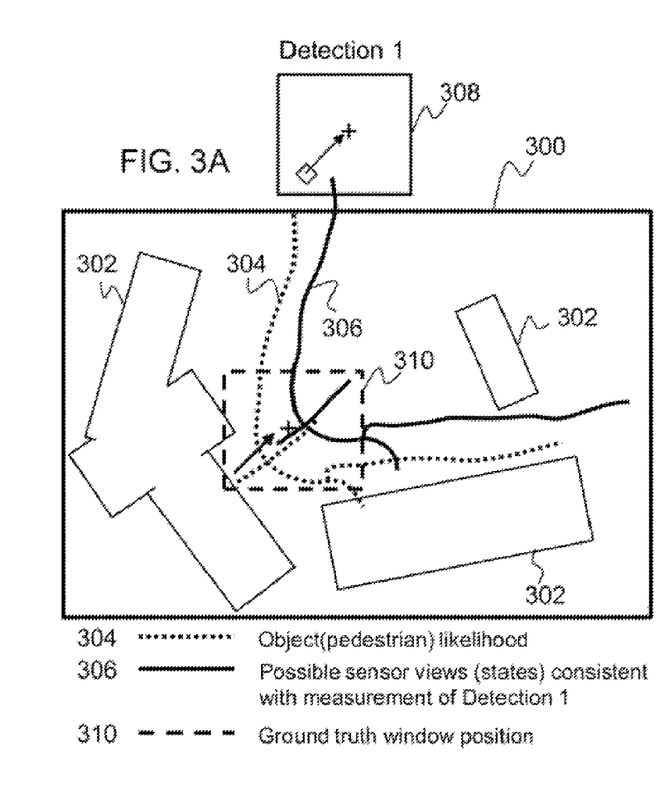
FIG. 3A is an illustration of a scene depicting sensor state estimation after one object detection according to the present invention.
Figure 3B:
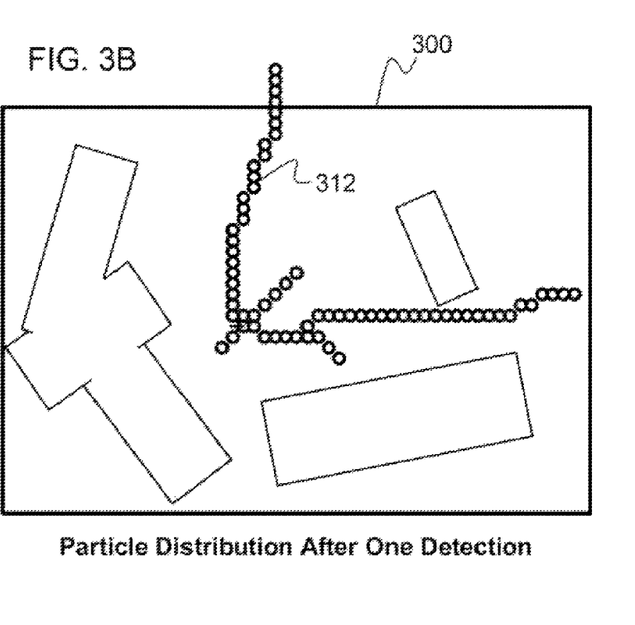
FIG. 3B is an illustration of a scene depicting particle distribution after one object detection according to the present invention.

An example of CEF sensor registration using pedestrian detections after one object detection (Detection 1) is shown in FIGS. 3A and 3B. An image of an overhead scene 300 comprising several buildings 302 is illustrated in FIG. 3A. A first region 304 indicates object (e.g., pedestrian, vehicle) likelihood, or where objects would likely be located. A second region 306 represents possible sensor views (i.e., states) consistent with the measurement of Detection 1308. The square region 310 represents the ground truth window position. FIG. 3B illustrates particle distribution after one object detection. The same scene 300 is shown with particle 312 distributions approximating the sensor view position.

Figure 4A:
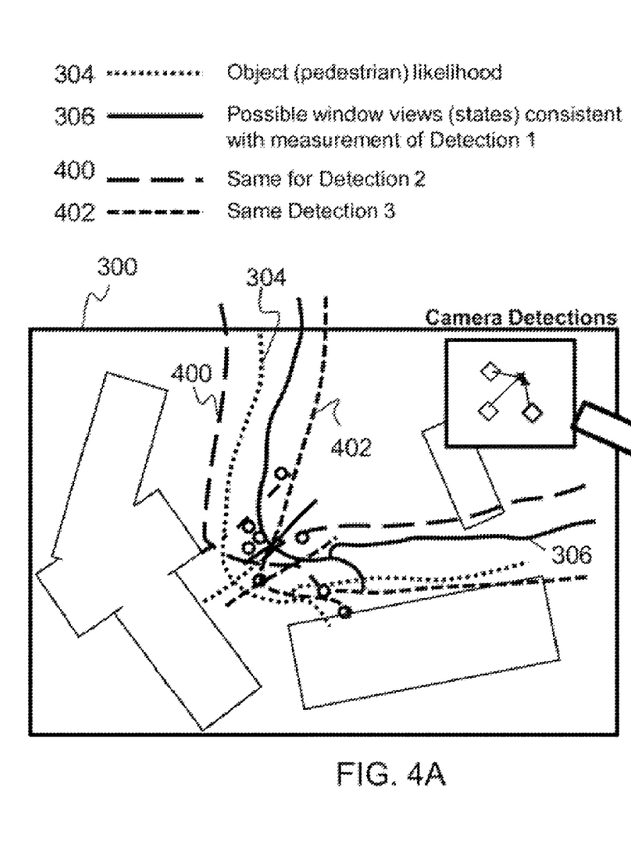
FIG. 4A is an illustration of a scene depicting sensor state estimation after multiple object detections according to the present invention.
Figure 4B:
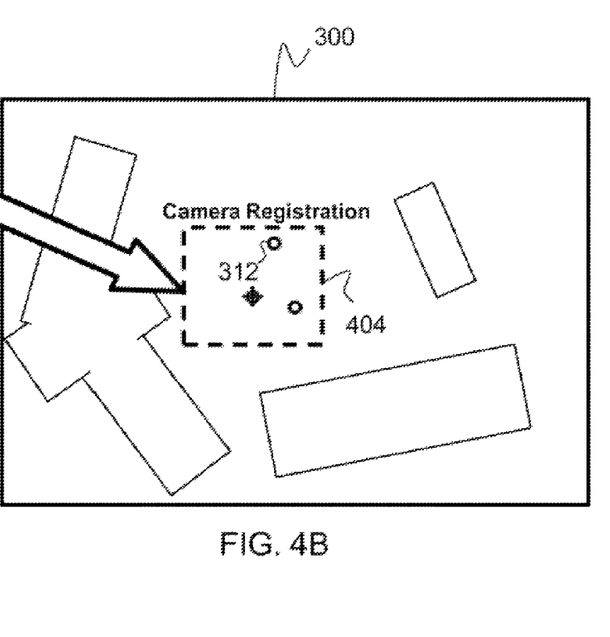
FIG. 4B is an illustration of a scene depicting particle distribution after multiple object detections according to the present invention.

FIGS. 4A and 4B illustrate sensor state estimation after multiple detections of the same scene 300 from FIGS. 3A and 3B. FIG. 4A depicts the first region 304 representing object (e.g., pedestrian) likelihood and the second region 306 representing possible window views (i.e., states) consistent with measurement of Detection 1. A third region 400 represents possible window views (i.e., states) consistent with measurement of Detection 2. A fourth region 402 represents possible window views (i.e., states) consistent with measurement of Detection 3. The multiple detections (e.g., Detections 1-3) quickly focus the CEF particles 312 (circles) on the correct camera registration position 404, as shown in FIG. 4B. Particle filter clustering occurs in sensor states that are most consistent with all measurements. The present invention provides posterior probability for multi-modal sensor registration. Furthermore, dimensionality can be increased to include rotation, scale, and viewing angle.

Figure 5A:
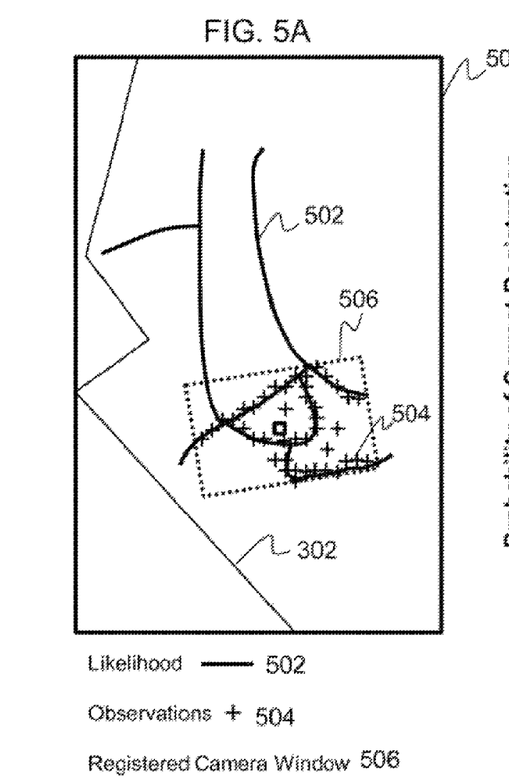
FIG. 5A is an illustration of simulation results for sensor view registration with three degrees of freedom according to the present invention.
Figure 5B:
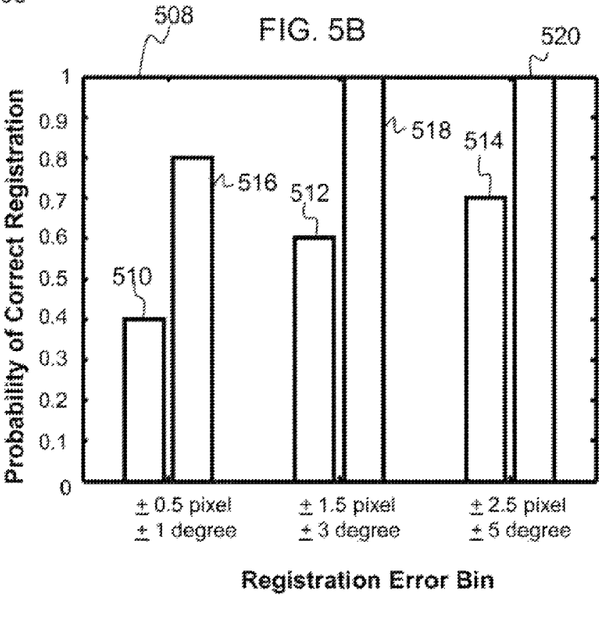
FIG. 5B is a graph illustration probabilities of correct registration given object observations according to the present invention.

Non-limiting examples of simulation results for CEF camera view registration with three degrees-of-freedom are shown in FIGS. 5A and 5B. The view 500 illustrated in FIG. 5A is an exploded-view of the scene shown in the previous figures, depicting a portion of a building 302 from FIGS. 3A, 3B, 4A, and 4B. A region 502 represents high likelihood for pedestrian (object) detections and behaviors. Crosses 504 represent human detections. The rectangular region 506 represents the final camera state estimate, which overlaps with the ground truth. The camera view was successfully registered in (x, y, γ) to within 1.5 pixels and three degrees in 100% of the cases. When the camera view is correctly registered, the x, y, and γ axes of the camera align with the scene.

FIG. 5B is a graph 508 depicting probability of correct registration given object observations. Bars 510, 512, and 514 represent 10 batches with 20 observations. Bars 516, 518, and 520 represent 10 batches with 30 observations. Both series contain 10% false alarms. Bars 510 and 516 show the probability of correct registration within ±0.5 pixels and ±1 degree. Bars 512 and 518 illustrate the probability of correct registration within ±1.5 pixels and ±3 degrees. Bars 514 and 520 represent the probability of correct registration within ±2.5 pixels and ±5 degrees. As shown in the graph 508, as the number of observations increase, the probability of correct registration increases. As shown by bar 518, the camera view was successfully registered in (x, y, θ) to within 1.5 pixels (e.g., 2 meters) and 3 degrees in 100% of the cases.

Figure 6:
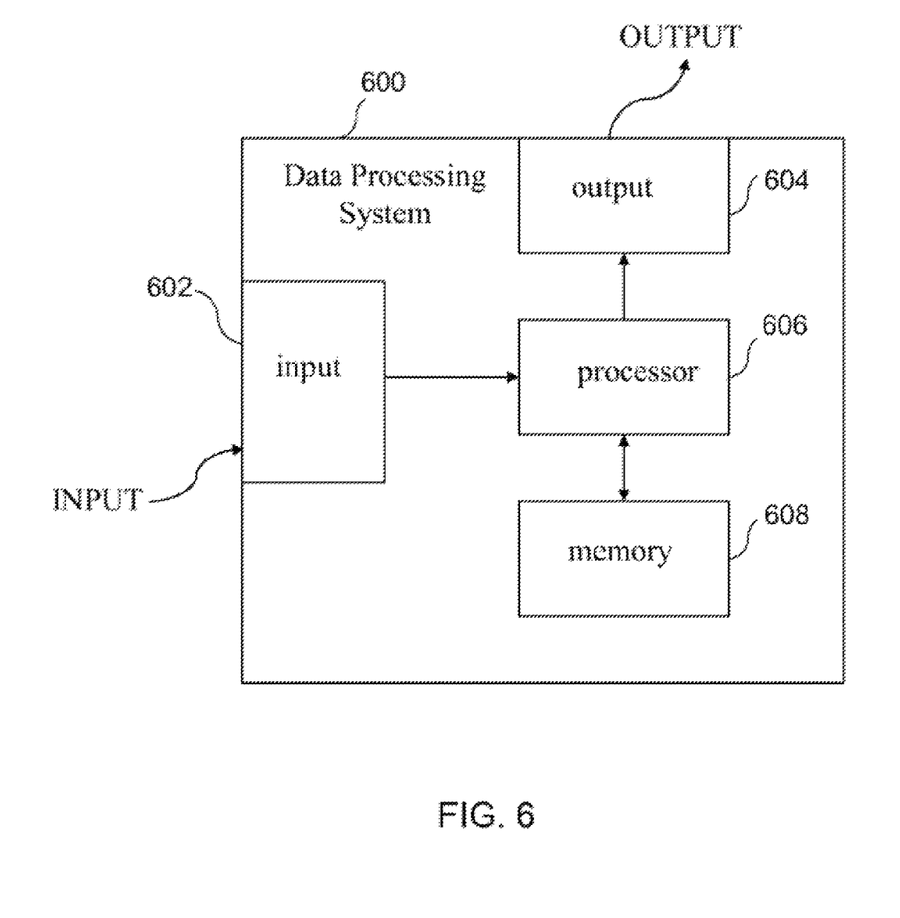
FIG. 6 is an illustration of a data processing system according to the present invention.

FIG. 6 illustrates a block diagram depicting components of a data processing system 600 (e.g., computer) incorporating the operations of the method described above and throughout the specification. The method utilizes a data processing system 600 for storing computer executable instructions (or instruction means) for causing a processor to carry out the operations of the above described method. The data processing system 600 comprises an input 602 for receiving information from a user. Information received may include input from devices such as cameras, scanners, keypads, keyboards, microphone, other peripherals such as storage devices, other programs, etc. The input 602 may include multiple "ports." An output 604 is connected with a processor 606 (or processors) for providing information for transmission to other data processing systems, to storage devices, to display devices such as monitors, to generating information necessary for delivery, and to other mechanisms for presentation in user-usable forms. The input 602 and the output 604 are both coupled with the processor 606, which may be a general-purpose computer processor or a specialized processor designed specifically for use with the present invention. The processor 606 is coupled with a memory 608 to permit storage of data and software to be manipulated by commands to the processor 606. The memory 608 includes instructions such that when the instructions are executed, the processor 608 (or processors) performs operations described above and throughout the specification.

Figure 7:
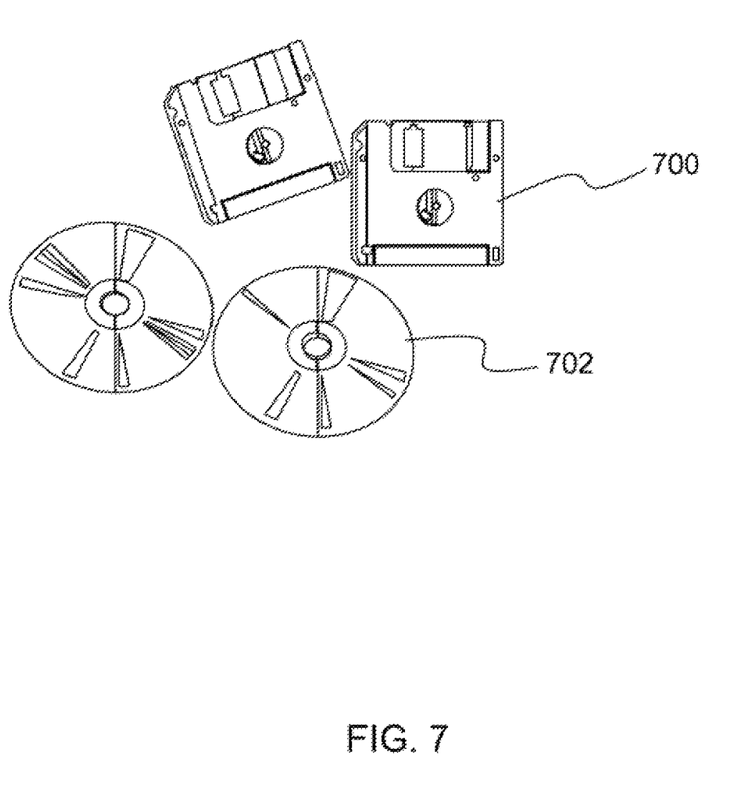
FIG. 7 is an illustration of a computer program product according to the present invention.

An illustrative diagram of a computer program product embodying the present invention is depicted in FIG. 7. As a non-limiting example, the computer program product is depicted as either a floppy disk 700 or an optical disk 702. However, as mentioned previously, the computer program product generally represents computer readable code (i.e., instruction means or instructions) stored on any compatible non-transitory computer readable medium.

What is claimed is:

1. A system for sensor viewpoint registration, the system comprising: one or more processors and a memory having instructions such that when the instructions are executed, the one or more processors perform operations of:

receiving an image of a scene of a geospatial region, wherein the image of the scene comprises at least one object, and wherein the image of the scene is captured by a sensor having a current sensor state x and a previous sensor state;

receiving observation data z related to the at least one object's state, wherein the observation data z comprises at least one object behavior of the at least one object given the geospatial region;

generating an estimate of the current sensor state x using a probability of an observation from the observation data z given the current sensor state x; and registering the image of the scene with a geospatial model or map based on the estimate of the current sensor state x, wherein the system further performs an operation of converging a set of particles on the estimate of the current sensor state x using the observation data z and the previous sensor state, wherein the set of particles represent a set of candidate registration solutions.

2. The system for sensor viewpoint registration as set forth in claim 1, wherein the system further performs an operation of updating the set of particles {st(n), n=1 ... N} and a set of weights of the particles {πt(n), n=1 ... N} from which the estimate of the current sensor slate x given the observation data z is determined as follows:

$$\hat{x}_t = E[x \mid z] = \sum_{n=1}^{N} \pi_t^{(n)} s_t^{(n)},$$

where $\hat{x}_t$ denotes a state of the sensor at time t, E denotes an expectation operator, and Σ represents a summation.

3. The system for sensor viewpoint registration as set forth in claim 2, wherein the system further performs an operation of determining the weights of each particle in the set of particles using a data likelihood function P(z|x), wherein the data likelihood function P(z|x) describes the probability of an observation being made at z given the current sensor state x.

4. The system for sensor viewpoint registration as set forth in claim 3, wherein the system further performs an operation of factorizing the data likelihood function P(z|x) into two densities: a function of a distance from the current sensor state x which captures noise of the sensor, and a function that determines whether the observation data z is located in a high likelihood geospatial region, according to the following:

$P(z|x) = P_a(z|x)P_b(z|x)$, where $$P_a(z \mid x) = A\exp(-\|z - x\|_\Sigma^2)$$

$$P_b(z \mid x) = \begin{cases} \alpha & \text{if } x \in O \\ 1 - \alpha & \text{if } x \notin O \end{cases},$$

where $P_a(z|x)$ denotes a probability density of the noise of the sensor parameterized by a multi-dimensional covariance matrix Σ, A is selected to normalize $P_a(z|x)$, $P_b(z|x)$ denotes a likelihood of measuring observation data z, which depends on whether the current sensor state x is in a high likelihood geospatial region O, α denotes a constant set to a value between 0.5 and 1 which determines a relative weighting given to geospatial information related to the geospatial region, exp( ) denotes the exponential function $e^{()}$, $\|\ldots\|_\Sigma$ denotes the Euclidean norm normalized by the covariance matrix Σ, ∈ means an element of, ∉ means is not an element of, and O is a set of sensor states that correspond to points in the geospatial region that have high likelihoods for generating observation data z.

5. The system for sensor viewpoint registration as set forth in claim 4, wherein the system further performs an operation of using the estimate of the current sensor state x to improve sensor measurements of the observation data z.

6. A computer-implemented method for sensor viewpoint registration, comprising an act of causing a data processor to execute instructions stored on a memory such that upon execution, the data processor performs operations of:
  receiving an image of a scene of a geospatial region, wherein the image of the scene comprises at least one object, and wherein the image of the scene is captured by a sensor having a current sensor state x and a previous sensor state:
  receiving observation data z related to the at least one object's state, wherein the observation data z comprises at least one object behavior of the at least one object given the geospatial region;
  generating an estimate of the current sensor state x using a probability of an observation from the observation data z given the current sensor state x; and
  registering the image of the scene with a geospatial model or map based on the estimate of the current sensor state x,
  further comprising an act of causing a data processor to perform an operation of converging a set of particles on the estimate of the current sensor state x using the observation data z and the previous sensor state, wherein the set of particles represent a set of candidate registration solutions.

7. The method for sensor viewpoint registration as set forth in claim 6, further comprising an act of causing a data processor to perform an operation of updating the set of particles {st(n), n=1 ... N} and their weights {πt(n), n=1 ... N} from which the estimate of the current sensor slate x given the observation data z is determined as follows:

$$\hat{x}_t = E[x \mid z] = \sum_{n=1}^{N} \pi_t^{(n)} s_t^{(n)},$$

where $\hat{x}_t$ denotes a state of the sensor at time t, E denotes an expectation operator, and Σ represents a summation.

8. The method for sensor viewpoint registration as set forth in claim 7, further comprising an act of causing a data processor to perform an operation of determining the weights of each particle in the set of particles using a data likelihood function P(z|x), wherein the data likelihood function P(z|x) describes the probability of an observation being made at z given the current sensor state x.

9. The method for sensor viewpoint registration as set forth in claim 8, further comprising an act of causing a data processor to perform an operation of factorizing the data likelihood function P(z|x) into two densities: a function of a distance from the current sensor state x which captures noise of the sensor, and a function that determines whether the observation data z is located in a high likelihood geospatial region, according to the following:

$P(z|x) = P_a(z|x)P_b(z|x)$, where $$P_a(z \mid x) = A\exp(-\|z - x\|_\Sigma^2)$$

$$P_b(z \mid x) = \begin{cases} \alpha & \text{if } x \in O \\ 1 - \alpha & \text{if } x \notin O \end{cases},$$

where $P_a(z|x)$ denotes a probability density of the noise of the sensor parameterized by a multi-dimensional covariance matrix Σ, $P_b(z|x)$ denotes a likelihood of measuring observation data z, which depends on whether the current sensor state x is in a high likelihood geospatial region O, α denotes a constant set to a value between 0.5 and 1 which determines a relative weighting given to geospatial information related to the geospatial region, exp( ) denotes the exponential function $e^{()}$, $\|\ldots\|_\Sigma$ denotes the Euclidean norm normalized by the covariance matrix Σ, ∈ means an element of, ∉ means is not an element of and O is a set of sensor states that correspond to points in the geospatial region that have high likelihoods for generating observation data z.

10. The method for sensor viewpoint registration as set forth in claim 9, further comprising an act of causing a data processor to perform an operation of using the estimate of the current sensor state x to improve sensor measurements of the observation data z.

11. A computer program product for sensor viewpoint registration, the computer program product comprising:

computer-readable instruction means stored on a non-transitory computer readable medium that are executable by a computer having a processor for causing the processor to perform operations of:

receiving an image of a scene of a geospatial region, wherein the image of the scene comprises at least one object, and wherein the image of the scene is captured by a sensor having a current sensor state x and a previous sensor state;

receiving observation data z related to the at least one object's state, wherein the observation data z comprises at least one object behavior of the at least one object given the geospatial region;

generating an estimate of the current sensor state x using a probability of an observation from the observation data z given the current sensor state x; and registering the image of the scene with a geospatial model or map based on the estimate of the current sensor state x, further comprising instruction means for causing a processor to perform an operation of converging a set of particles on the estimate of the current sensor state x using the observation data z and the previous sensor state, wherein the set of particles represent a set of candidate registration solutions.

12. The computer program product for sensor viewpoint registration as set forth in claim 11, further comprising instruction means for causing a processor to perform an operation of updating the set of particles $\{s_t(n), n=1 \ldots N\}$ and their weights $\{\pi_t(n), n=1 \ldots N\}$ from which the estimate of the current sensor slate x given the observation data z is determined as follows:

$$\hat{x}_t = E[x \mid z] = \sum_{n=1}^{N} \pi_t^{(n)} s_t^{(n)},$$

where $\hat{x}_t$ denotes a state of the sensor at time t, E denotes an expectation operator, and $\Sigma$ represents a summation.

13. The computer program product for sensor viewpoint registration as set forth in claim 12, further comprising instruction means for causing a processor to perform an operation of determining the weights of each particle in the set of particles using a data likelihood function P(z|x), wherein the data likelihood function P(z|x) describes the probability of an observation being made at z given the current sensor state x.

14. The computer program product for sensor viewpoint registration as set forth in claim 13, further comprising instruction means for causing a processor to perform an operation of factorizing the data likelihood function P(z|x) into two densities: a function of a distance from the current sensor state x which captures noise of the sensor, and a function that determines whether the observation data z is located in a high likelihood geospatial region, according to the following:

$$P(z|x) = P_a(z|x) P_b(z|x)$$

$$P_a(z \mid x) = A \exp(-\|z - x\|_\Sigma^2)$$

$$P_b(z \mid x) = \begin{cases} \alpha & \text{if } x \in O \\ 1 - \alpha & \text{if } x \notin O \end{cases},$$

where $P_a(z|x)$ denotes a probability density of the noise of the sensor parameterized by a multi-dimensional covariance matrix $\Sigma$, $P_b(z|x)$ denotes a likelihood of measuring observation data z, which depends on whether the current sensor state x is in a high likelihood geospatial region O, $\alpha$ denotes a constant set to a value between 0.5 and 1 which determines a relative weighting given to geospatial information related to the geospatial region, exp( ) denotes the exponential function $e^{(\ )}$, $\| \ldots \|_\Sigma$ denotes the Euclidean norm normalized by the covariance matrix $\Sigma$, $\in$ means an element of, $\notin$ means is not an element of, and O is a set of sensor states that correspond to points in the geospatial region that have high likelihoods for generating observation data z.

15. The computer program product for sensor viewpoint registration as set forth in claim 14, further comprising instruction means for causing a processor to perform an operation of using the estimate of the current sensor state x to improve sensor measurements of the observation data z.

* * * * *